US009749577B1

(12) United States Patent
Thomas et al.

(10) Patent No.: US 9,749,577 B1
(45) Date of Patent: Aug. 29, 2017

(54) HOST VIDEO RECORDING BY BASEBOARD MANAGEMENT CONTROLLER (BMC)

(71) Applicant: American Megatrends, Inc., Norcross, GA (US)

(72) Inventors: Satheesh Thomas, Dunwoody, GA (US); Durga Chhangani, Kolkata (IN); Venkatesan Balakrishnan, Chennai (IN); Othiyappan Kanniappan, Chennai (IN); Gopinath Sekaran, Sholinghur (IN)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 15/227,566

(22) Filed: Aug. 3, 2016

(51) Int. Cl.
*H04N 5/91* (2006.01)
*H04N 5/907* (2006.01)
*G11B 20/10* (2006.01)
*G11B 27/19* (2006.01)

(52) U.S. Cl.
CPC ......... *H04N 5/91* (2013.01); *G11B 20/10527* (2013.01); *G11B 27/19* (2013.01); *H04N 5/907* (2013.01); *G11B 2020/10537* (2013.01); *G11B 2220/61* (2013.01)

(58) Field of Classification Search
CPC .... H04N 5/91; H04N 5/907; G11B 20/10527; G11B 27/19
See application file for complete search history.

(56) References Cited

U.S. PATENT DOCUMENTS

| 5,720,016 | A | * | 2/1998 | Egashira | G09G 5/14 358/1.18 |
| 8,640,118 | B2 | * | 1/2014 | Grice | G06F 8/665 717/168 |
| 2008/0072173 | A1 | * | 3/2008 | Brunner | G06F 9/4443 715/788 |
| 2010/0235833 | A1 | * | 9/2010 | Huang | G06F 21/575 718/1 |
| 2010/0325074 | A1 | * | 12/2010 | Ng | G08B 21/04 706/12 |
| 2015/0050004 | A1 | * | 2/2015 | Swaminathan | H04N 21/854 386/241 |
| 2015/0295994 | A1 | * | 10/2015 | Siegman | G06F 17/30076 709/203 |

* cited by examiner

*Primary Examiner* — Mishawn Hunter
(74) *Attorney, Agent, or Firm* — Locke Lord LLP; Tim Tingkang Xia, Esq.

(57) ABSTRACT

Aspects of the disclosure relate to systems and methods of recording video frames from a computing device by a management device. The management device may receive video frames from the computing device. In response to receiving the video frames, the management device may process the video frames in a first-in-first out (FIFO) order to generate processed video frames according to a recording method, store the processed video frames in the FIFO order in the memory of the management device, and then release the memory occupied by some of the processed video frames in the FIFO order based on a memory releasing condition defined by the recording method to store the processed video frame. The memory releasing condition is determined by multiple optimized parameters of the recording method. The recording method may be a sliding window recording method, a multiple-window fixed size recording method, or a multiple-window dynamic size recording method.

26 Claims, 9 Drawing Sheets

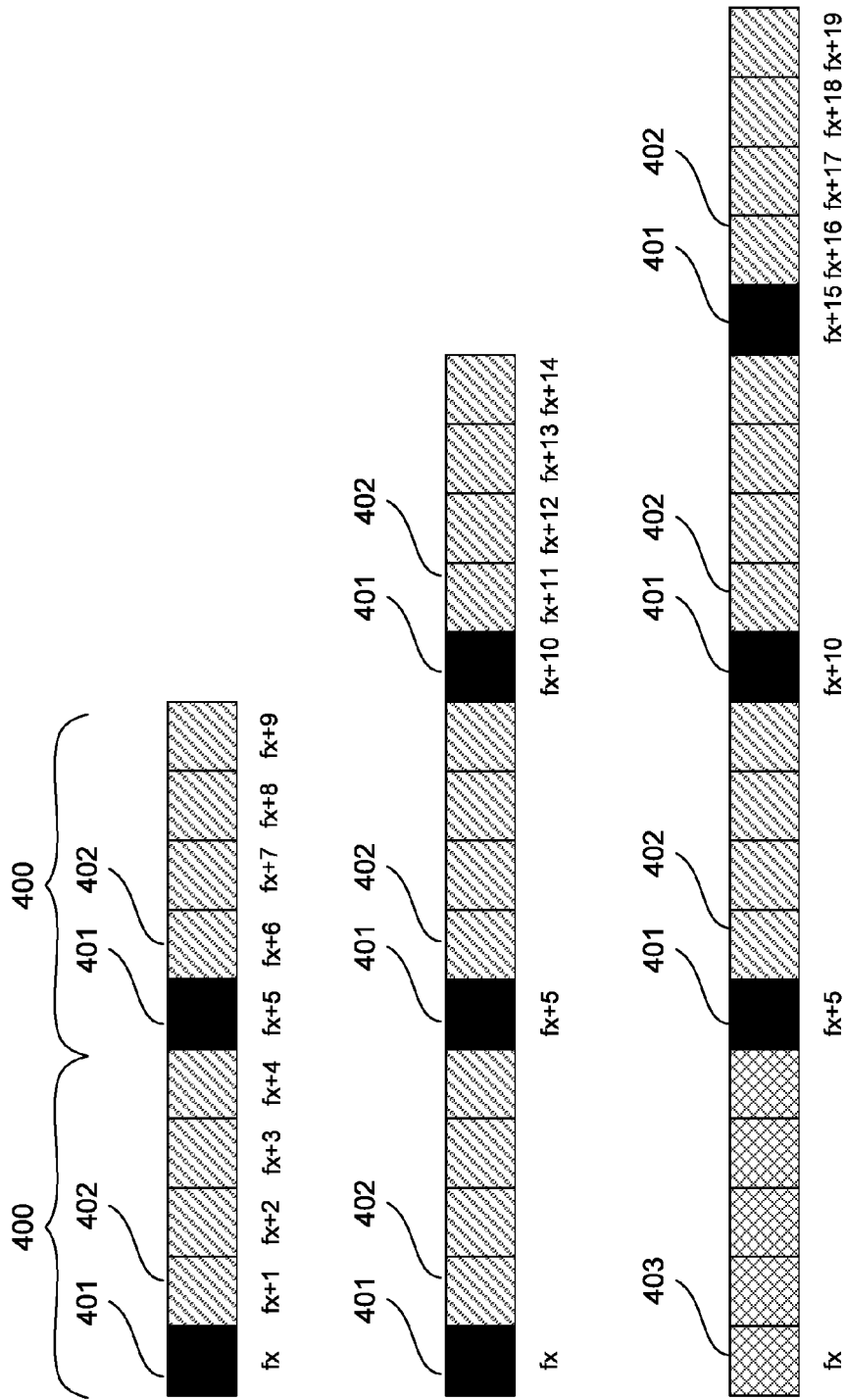

HOST VIDEO RECORDING BY BASEBOARD MANAGEMENT CONTROLLER (BMC)

FIELD

The present disclosure relates generally to baseboard management controller (BMC) technology, and more particularly to systems and methods for recording video from a host computer by a BMC using video redirection efficiently.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Incidents may occur during power on or during normal use or operation of a computing device. The video before occurrence of an incident often include important information for diagnosing and fixing the problem causing the incident. However, the recording of the video before occurrence of the incident may be a complex process that uses much resources of the computing device, and an efficient, cost-effective method of recording the video is needed.

Therefore, an unaddressed need exists in the art to address the aforementioned deficiencies and inadequacies.

SUMMARY

Certain aspects of the present disclosure relate to a system, which includes a computing device and a management device in communication with the computing device. The management device includes a processor, a memory and a non-volatile memory storing computer executable code. The computer executable code, when executed at the processor, is configured to: receive, by the management device, video frames from the computing device; and in response to receiving the video frames from the computing device, process the video frames in a first-in-first out (FIFO) order to generate processed video frames according to a recording method; store the processed video frames in the FIFO order in the memory of the management device; and release the memory occupied by some of the processed video frames in the FIFO order based on a memory releasing condition defined by the recording method to store the processed video frame. The recording method defines at most W windows, W being a positive integer, each of the W windows includes a first processed video frame and at least one subsequent processed video frame, and wherein for each of the W windows, the first processed video frame is a full frame, and each of the at least one subsequent processed video frame is a delta frame. The recording method defines, based on an available memory size of the memory to store the processed video frames, a plurality of optimized parameters selected from W, a maximum number N of the processed video frames in each of the W windows, a maximum size S of the memory occupied by each of the W windows, a number M of the processed video frames to be released, and a required number R of the processed video frames to be stored, where N, S, M and R are respectively positive integers, N>1, and M is no greater than N. The memory releasing condition is determined by the plurality of optimized parameters.

In certain embodiments, the management device is a baseboard management controller (BMC), and the computing device functions as a host computer for the BMC.

In certain embodiments, the computer executable code, when executed at the processor, is further configured to select the recording method from a plurality of algorithms according to the available memory size of the memory.

In certain embodiments, the recording method is a sliding window recording method, W=1, the optimized parameters comprise N and M, N>M, and the memory releasing condition is storing N of the processed video frames in the FIFO order in the memory and receiving a new video frame to be processed, where the sliding window recording method includes: storing up to N of the processed video frames in the FIFO order in the memory; and in response to the memory releasing condition of storing the N of the processed video frames and receiving the new video frame to be processed, converting the (M+1)th processed video frame of the N processed video frames from the delta frame to the full frame; storing the converted full frame of the (M+1)th processed video frame as a new first processed video frame of the window; releasing the memory occupied by first to M-th processed video frames of the N processed video frames in the FIFO order; and processing the new video frame and storing up to M new processed video frames.

In certain embodiments, (N−M) is greater than a predetermined number X, wherein X of the processed video frames are required for recording an incident of the computing device, such that the incident is diagnosable based on the vide frames recorded.

In certain embodiments, M is in a range of 2-10.

In certain embodiments, the recording method is a multiple-window fixed size recording method, W>2, the optimized parameters include W and N, M=N, and the memory releasing condition is storing the W windows of the processed video frames in the FIFO order in the memory and receiving a new video frame to be processed, where the multiple-window fixed size recording method includes: storing up to W*N the processed video frames in the FIFO order in the memory, wherein the W*N the processed video frames constitute the W windows; and in response to the memory releasing condition of storing the W windows of the processed video frames in the FIFO order in the memory and receiving the new video frame to be processed, releasing the memory occupied by the N processed video frames of a first window in the FIFO order from the W windows; and processing the new video frame and storing the new processed video frame in a new window in the FIFO order.

In certain embodiments, a value of N is determined by a ratio between a full frame memory size of the first processed video frame and a delta frame memory size of the at least one subsequent processed video frame in the first window of the W windows.

In certain embodiments, the computer executable code, when executed at the processor, is further configured to: provide a link list corresponding to each of the W windows, for constructing a continuous video from the processed video frames recorded in the W windows.

In certain embodiments, the recording method is a multiple-window dynamic size recording method, W>2, the optimized parameters include S and R, the memory releasing condition is storing the required number R of the processed video frames in the FIFO order in the memory and receiving a new video frame to be processed, and W and N are respectively variable, where the multiple-window dynamic size recording method includes: storing up to the required number R of the processed video frames in the FIFO order in the memory; and in response to the memory releasing condition of storing the required number R of the processed video frames in the FIFO order in the memory and receiving the new video frame to be processed, releasing the memory occupied by the processed video frames of a first window in the FIFO order from the W windows; and processing the new video frame and storing the new processed video frame in a new window in the FIFO order.

In certain embodiments, a value of S is determined by a ratio between a full frame memory size of the first processed video frame and a delta frame memory size of the at least one subsequent processed video frame of each of the W windows.

In certain embodiments, for each of the W windows, the delta frame memory size of the at least one subsequent processed video frame is an average memory size of each of the at least one subsequent processed video frame.

Certain aspects of the present disclosure relate to a method of recording video frames from a computing device by a management device. In certain embodiments, the method includes: receiving, by the management device, video frames from the computing device; and in response to receiving the video frames from the computing device, processing, by the management device, the video frames in a first-in-first out (FIFO) order to generate processed video frames according to a recording method; storing the processed video frames in the FIFO order in a memory of the management device; and releasing the memory occupied by some of the processed video frames in the FIFO order based on a memory releasing condition defined by the recording method to store the processed video frame. In certain embodiments, the recording method defines at most W windows, W being a positive integer, each of the W windows comprises a first processed video frame and at least one subsequent processed video frame, and wherein for each of the W windows, the first processed video frame is a full frame, and each of the at least one subsequent processed video frame is a delta frame. In certain embodiments, the recording method defines, based on an available memory size of the memory to store the processed video frames, a plurality of optimized parameters selected from W, a maximum number N of the processed video frames in each of the W windows, a maximum size S of the memory occupied by each of the W windows, a number M of the processed video frames to be released, and a required number R of the processed video frames to be stored, wherein N, S, M and R are respectively positive integers, N>1, and M is no greater than N. In certain embodiments, the memory releasing condition is determined by the plurality of optimized parameters.

In certain embodiments, the management device is a BMC, and the computing device functions as a host computer for the BMC.

In certain embodiments, the method further includes: selecting, by the management device, the recording method from a plurality of algorithms according to the available memory size of the memory.

In certain embodiments, the recording method is a sliding window recording method, W=1, the optimized parameters comprise N and M, N>M, and the memory releasing condition is storing N of the processed video frames in the FIFO order in the memory and receiving a new video frame to be processed, where the sliding window recording method includes: storing up to N of the processed video frames in the FIFO order in the memory; and in response to the memory releasing condition of storing the N of the processed video frames and receiving the new video frame to be processed, converting the (M+1)th processed video frame of the N processed video frames from the delta frame to the full frame; storing the converted full frame of the (M+1)th processed video frame as a new first processed video frame of the window; releasing the memory occupied by first to M-th processed video frames of the N processed video frames in the FIFO order; and processing the new video frame and storing up to M new processed video frames.

In certain embodiments, the recording method is a multiple-window fixed size recording method, W>2, the optimized parameters include W and N, M=N, and the memory releasing condition is storing the W windows of the processed video frames in the FIFO order in the memory and receiving a new video frame to be processed, where the multiple-window fixed size recording method includes: storing up to W*N the processed video frames in the FIFO order in the memory, wherein the W*N the processed video frames constitute the W windows; and in response to the memory releasing condition of storing the W windows of the processed video frames in the FIFO order in the memory and receiving the new video frame to be processed, releasing the memory occupied by the N processed video frames of a first window in the FIFO order from the W windows; and processing the new video frame and storing the new processed video frame in a new window in the FIFO order.

In certain embodiments, a value of N is determined by a ratio between a full frame memory size of the first processed video frame and a delta frame memory size of the at least one subsequent processed video frame in the first window of the W windows.

In certain embodiments, the recording method is a multiple-window dynamic size recording method, W>2, the optimized parameters include S and R, the memory releasing condition is storing the required number R of the processed video frames in the FIFO order in the memory and receiving a new video frame to be processed, and W and N are respectively variable, where the multiple-window dynamic size recording method includes: storing up to the required number R of the processed video frames in the FIFO order in the memory; and in response to the memory releasing condition of storing the required number R of the processed video frames in the FIFO order in the memory and receiving the new video frame to be processed, releasing the memory occupied by the processed video frames of a first window in the FIFO order from the W windows; and processing the new video frame and storing the new processed video frame in a new window in the FIFO order.

In certain embodiments, a value of S is determined by a ratio between a full frame memory size of the first processed video frame and a delta frame memory size of the at least one subsequent processed video frame of each of the W windows.

In certain embodiments, for each of the W windows, the delta frame memory size of the at least one subsequent processed video frame is an average memory size of each of the at least one subsequent processed video frame.

Certain aspects of the present disclosure relate to a non-transitory computer readable medium storing computer executable code. In certain embodiments, the computer executable code, when executed at a processor of a management device, is configured to: receive video frames from a computing device; and in response to receiving the video frames from the computing device, process the video frames in a first-in-first out (FIFO) order to generate processed video frames according to a recording method; store the processed video frames in the FIFO order in the memory of the management device; and release the memory occupied by some of the processed video frames in the FIFO order based on a memory releasing condition defined by the recording method to store the processed video frame. In certain embodiments, the recording method defines at most W windows, W being a positive integer, each of the W windows comprises a first processed video frame and at least one subsequent processed video frame, and wherein for each of the W windows, the first processed video frame is a full frame, and each of the at least one subsequent processed video frame is a delta frame. In certain embodiments, the recording method defines, based on an available memory size of the memory to store the processed video frames, a plurality of optimized parameters selected from W, a maximum number N of the processed video frames in each of the W windows, a maximum size S of the memory occupied by each of the W windows, a number M of the processed video frames to be released, and a required number R of the processed video frames to be stored, wherein N, S, M and R are respectively positive integers, N>1, and M is no greater than N. In certain embodiments, the memory releasing condition is determined by the plurality of optimized parameters.

In certain embodiments, the computer executable code includes: a redirection module, configured to receive the video frames from the computing device, and store the processed video frames in the memory of the management device; an algorithm database, configured to store information of the recording method; and a processing module, configured to process the video frames to generate the processed video frames according to the recording method.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein:

FIG. 4A schematically depict a multiple-window fixed size recoding method according to certain embodiments of the present disclosure.

DETAILED DESCRIPTION

Figure 1:
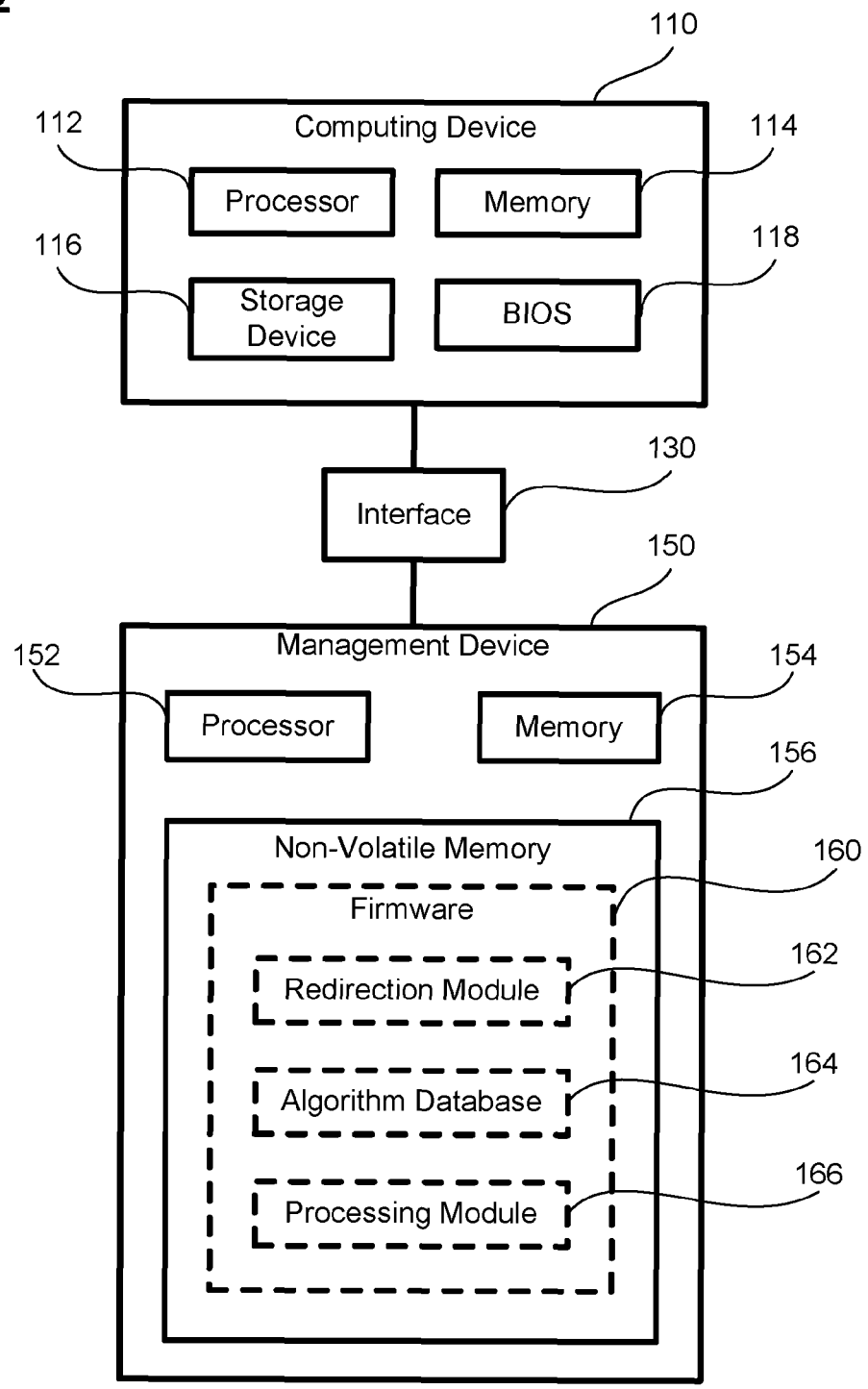
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The term "FIFO", as used herein, is an acronym for "first-in-first-out," which is a method for organizing and manipulating a data buffer, where the oldest (first) entry, or "head" of the queue, is processed first. It is analogous to processing a queue with first-come, first-served (FCFS) behavior: where the people leave the queue in the order in which they arrive.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

As discussed above, incidents may occur during power on or during normal use or operation of a computing device. Techniques have been disclosed using the BMC to perform host video redirection. When a BMC is provided on the computing device (which functions as a host computer of the BMC), the video redirection techniques of the BMC may be used to record video frames from the host computer for future references. For example, a BMC may be configured to record a video clip with a length of 60 seconds following the power on of the host computer. The length of 60 seconds is generally determined based on the available memory size of the BMC. Accordingly, certain aspects of the present disclosure relate to a system and a method for recording video redirected from a host computer efficiently using the BMC, where the BMC may be configured to record the history prior to the incident, such as recording a 60-second video prior to the shut-down incident of the host computer.

In accordance with the purposes of present disclosure, as embodied and broadly described herein, in certain aspects, the present disclosure relates to a system having a computing device and a management device in communication with the computing device. FIG. 1 schematically depicts an exemplary system according to certain embodiments of the present disclosure. As shown in FIG. 1, system 100 includes a computing device 110, a management device 150, and an interface 130 connecting the computing device 110 and the management device 150.

The computing device 110 may function as a host computer of the management device 150. In certain embodiments, the computing device 110 may be a general purpose computer, a specialized computer, or a headless computer. In certain embodiments, as shown in FIG. 1, the computing device 110 may include, without being limited to, a processor 112, a memory 114, a storage device 116, a basic input/output system (BIOS) 118, and other required memory and I/O modules (not shown). Generally, the computing device 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. In certain embodiments, the processor 112 and the memory 114 may be components embedded on the baseboard, or may be connected to the baseboard through at least one interface. In certain embodiments, the interface may be physical hardware interface such as electrical connectors, buses, ports, cables, terminals, or other I/O devices. One of ordinary skill in the art would appreciate that the configuration of the baseboard may be adjusted or changed according to the necessary design or manufacturing requirements.

The processor 112 may be a central processing unit (CPU) which is configured to control operation of the computing device 110. The processor 112 can execute an operating system (OS) or other applications of the computing device 110. In some embodiments, the computing device 100 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110.

The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110.

The BIOS 118 is a type of firmware used to perform hardware initialization during the booting process (power-on startup) on the computing device 110, and to provide run-time services for operating systems and programs. In certain embodiments, the BIOS 118 is implemented as a BIOS chip built into the computing device 110. For example, the BIOS chip may be provided on the baseboard of the computing device 110. In certain embodiments, when the computing device 110 is powered on, the BIOS 118 is executed first at the start of the booting process.

The management device 150 is a microcontroller used to monitor the operation of the computing device 110. In certain embodiments, the management device 150 may be a component on the baseboard of the computing device 110. In certain embodiments, the management device 150 is a separated component from the computing device 110, and the interface 130 may be present between the computing device 110 and the management device 150. In certain embodiment, the interface 130 may be a system interface, a USB interface or a network, or any other types of interfaces to communicatively connect the management device 150 to the computing device 110.

In certain embodiments, the management device 150 may be connected to more than one computing device, and among these computing devices, only the computing device 110 functions as the host computer of the management device 150.

In certain embodiments, the management device 150 may be implemented by a system on chip (SoC), such as a BMC or a service processor (SP), or by other management controllers. The BMC refers to a specialized microcontroller that manages the interface between system management software and platform hardware. Different types of sensors can be built into the computing device 110, and the BMC reads these sensors to obtain parameters such as temperature, cooling fan speeds, power status, OS status, etc. The BMC monitors the sensors and can send alerts to a system administrator via a network if any of the parameters do not stay within preset limits, indicating a potential failure of the computing device 110. The administrator can also remotely communicate with the BMC to take some corrective action such as resetting or power cycling the system to get a hung OS running again.

In certain embodiments, the management device 150 may include necessary hardware and software components to perform certain predetermined tasks. For example, as shown in FIG. 1, the management device 150 includes a processor 152, a memory 154, and a non-volatile memory 156. In certain embodiments, the processor 152, the memory 154, and the non-volatile memory 156 may be similar to the processor 112, the memory 114, and the storage device 116 of the computing device 110. Further, the management device 150 may include other hardware components and software components (not shown) to perform its corresponding tasks. Examples of these hardware and software components may include, but not limited to, other required memory, interfaces, buses, I/O modules and peripheral devices.

The processor 152 is configured to control operation of the management device 150. In certain embodiments, the processor 152 may be a central processing unit (CPU). The processor 152 can execute any computer executable code or instructions, such as the firmware 160 of the management device 150 or other applications and instructions of the management device 150. In certain embodiments, the management device 150 may run on more than one processor, such as two processors, four processors, eight processors, or any suitable number of processors.

The memory 154 can be a volatile memory, such as the random-access memory (RAM), for storing the data and information during the operation of the management device 150. In certain embodiments, the memory 154 may be a volatile memory array.

The non-volatile memory 156 is a data storage media for storing the applications of the management device 150. Examples of the non-volatile memory 156 may include flash memory, memory cards, USB drives, hard drives, floppy disks, optical drives, or any other types of non-volatile data storage devices. In certain embodiments, the management device 150 may have multiple non-volatile memories 156, which may be identical storage devices or different types of storage devices, and the applications may be stored in one or more of the non-volatile memories 156 of the management device 150.

As shown in FIG. 1, the non-volatile memory 156 of the management device 150 stores a firmware 160, which may include, among other things, a redirection module 162, an algorithm database 164, and a processing module 166. In certain embodiments, the firmware 160 may include other applications or modules necessary for the operation of the management device 150. It should be noted that all of the modules of the firmware 160 are each implemented by computer executable codes or instructions, which collectively forms the firmware 160. In certain embodiments, each of the modules may further include sub-modules. Alternatively, some of the modules may be combined as one stack.

The redirection module 162 is configured to perform video redirection process for the computing device 110. Specifically, in the video redirection process, the redirection module 162 is configured to "redirect" or receive video frames from the computing device 110 to the management device 150, and to record or store the video frames received in the memory 154. In certain embodiments, some or all of the video frames received may be directly recorded or stored in the memory 154. In certain embodiments, some or all of the video frames received may be processed by the processing module 166 to become processed video frames, before the redirection module 162 records or stores the processed video frames into the memory 154. In certain embodiments, the video frames (or the processed video frames) may also be stored in the non-volatile memory 156.

The processing module 166 is configured to process the video frames received from the computing device 110, according to the recording method or algorithm provided by the algorithm database 164, to generate the processed video frames according to the recording method. In certain embodiments, the processing module 166 is configured to process the video frames in a FIFO order. In other words, when a video frame is received by the redirection module 162, the processing module 166 will process the video frame and send the processed video frame back to the redirection module 162 to store the processed video frame in the memory 154, before processing a next video frame. In this way, the video frames will be processed and stored in the FIFO order. When the memory space occupied by some of recorded video frames needs to be released for further frame recording process, the video frames being stored earlier will be released first.

The algorithm database 164 provides at least one algorithm for processing the video frames received from the computing device 110. The algorithm is hereinafter referred to as a "recoding method," which includes the rules and procedures to process the video frames, record the processed video frames in the memory 154, and/or release the memory space occupied by recorded video frames for further frame recording process. In certain embodiments, the processing module 166 may process the video frames according to the rules and procedures of the recording method to generate the processed video frames, and the redirection module 162 may store the processed video frames in the memory 154 according to the rules and procedures of the recording method.

In certain embodiments, the rules and procedures of the recording method may include, without being limited to, one or more "windows," a plurality of optimized parameters, and a memory releasing condition. In certain embodiments, the memory releasing condition may be determined by the plurality of optimized parameters. Details of these rules and procedures will be hereinafter described with examples.

The window is a collection of processed video frames to be stored in the memory 154. In certain embodiments, the recording method defines at most W windows, where W is a positive integer. In other words, the recoding method may be a single-window method where W=1 (i.e., only one window is defined), or a multiple-window method where W>1 (i.e., multiple windows are defined). In certain embodiments, each window may include multiple processed video frames, including a first processed video frame and at least one subsequent processed video frame in the FIFO order. In certain embodiments, for each window, the first processed video frame may be a full frame, which includes all information of the video frame; and each of the at least one subsequent processed video frame is a delta frame, which includes only information of the differences between the video frame and an immediate previous video frame in the FIFO order. In certain embodiments, each of the video frames may be divided into a plurality of blocks, and the delta frame is defined to include information of differences between the corresponding blocks of the video frames.

The optimized parameters of the recording method may be defined based on the nature of the recording method. In certain embodiments, the optimized parameters may be selected from a plurality of numbers related to an available memory size of the memory 154 to store the processed video frames. For example, one of the optimized parameters being defined by the recording method may be the number W of the windows. Other optimized parameters that may be used include a maximum number N of the processed video frames in each of the W windows, a maximum size S of the memory occupied by each of the W windows, a number M of the processed video frames to be released, and a required number R of the processed video frames to be stored, where N, S, M and R are respectively positive integers. Since each window include multiple processed video frames, N>1. In certain embodiments, M is no greater than N. The value of each of the optimized parameters may be determined based on the available memory size of the memory 154 to store the processed video frames. Details of the optimized parameters being defined in the recording method will be described later.

In certain embodiments, the algorithm database 164 may provide a single algorithm as the recording method. In certain embodiments, the algorithm database 164 may provide multiple algorithms for selection, such that the management device 150 may select one of the algorithms as the recording method. In certain embodiments, the firmware 160 may further include a selection module (not shown) to select one of the algorithms as the recording method, and the selection of the algorithms may be conducted automatically by the selection module of the firmware 160. In this case, the recording method may be selected from the multiple algorithms according to at least one of the available memory size of the memory 154, the allocated memory space for storing processed video frames of the memory 154, and the processing power of the processor 152. Alternatively, in certain embodiments, the selection of the algorithms may be manually performed based on user inputs.

In certain aspects, the present disclosure relates to a method of recording video frames from the computing device by the management device. In certain embodiments, the method may be implemented by a system as shown in FIG. 1. Specifically, the management device 150 (e.g., a BMC) may perform video redirection for the computing device 110 (i.e., the host computer of the BMC). For example, in the process of storing or recording the redirected video frames, firstly, the video frames from the computing device 110 may be redirected to and received by the BMC. In this case, the BMC may record a first video file, and the first video file has a predetermined memory size to fill a predetermined length of videos (i.e., a predetermined number of video frames). For example, a 60-second video with the one frame per second recording rate may contain 60 frames. After recording the first video file, the BMC continues the recording process, and records or fill a second video file. The second video file has substantially the same capacity (i.e., the memory size) as the first video file to fill the predetermined number of video frames. After recording the second video file, the BMC continues the recording process, and records or fill the third video file. The third video file has substantially the same capacity (i.e., the memory size) as the first video file to fill the predetermined number of video frames.

In certain embodiments as shown below, the video file includes video frames. The first video frame is a full frame, and the remaining video frames will be delta frames (shown as the symbol $\Delta$) in a continuous manner. For example, each of the remaining video frames may be shown as a function of a previous frame, such as:

Second frame=computationfunciton (first frame+$\Delta 1$),

Third frame=computationfunciton (second frame+$\Delta 2$).

In other words, once the video from the host computer is recorded, the first frame is a full frame; the second frame is compared with the first frame, and the difference between the first frame and the second frame is Δ1, and the second frame is not recorded by its full information of the video frame, but is recorded as Δ1. Similarly, the third frame is compared with the second frame, and the difference between the second frame and the third frame is Δ2, and the third frame is not recorded by its full information of the video frame, but is recorded as Δ2. Thus, the second frame may be restored by adding the information of the first full frame and Δ1. Similarly, the third frame may be restored by adding the information of the second full frame and Δ2, or the first full frame+Δ1+Δ2. The size of each delta frame Δ depends on the nature of the video. For example, if the image of the video frame only includes lines of text, and the change of the text is slow, the size of each delta frame Δ may be small. If the video includes a motion picture, which includes frequent scene change, the size of each delta frame Δ may be large.

In certain embodiments, the BMC performs continuous recording until the incident occurs in the host computer. Due to the limited available memory size of the BMC, the required duration of the video files being recorded will be limited. Thus, the BMC needs to keep only the last frames for the required duration. For example, for a requirement with keeping a record of 60 seconds of video, the implementation could be recording video contents into a file every one minute, and then deleting the file for the previous minute and start a new file of the current minute. In this case, the recording of the video files may be shown in a Table 1, which is provided below:

TABLE 1

| T1 time | Vdo_dump_0.dat | | |
|---|---|---|---|
| T2 time = T1 + 60 sec | Vdo_dump_0.dat | Vdo_dump_1.dat | |
| T3 time = T2 + 60 sec | Vdo_dump_0.dat | Vdo_dump_1.dat | Vdo_dump_2.dat |

As shown in Table 1, at time T1, one video file Vdo_dump_0.dat is created and will fill video data (i.e., video frames) for 60 seconds. At time T2, one 60-second video file Vdo_dump_0.dat has been recorded, and another 60-second video file Vdo_dump_1.dat will start filling data (i.e., video frames). At this time, the BMC should not delete the older video file of Vdo_dump_0.dat to keep at least 60 seconds of video available. If at T2+n (n<60 second) the process crash occurs at the host computer, and the recording file of Vdo_dump_1.dat is not filled up to 60 seconds, the BMC will not have required duration of video data if the older video file of Vdo_dump_0.dat is deleted. Thus, the BMC will keep Vdo_dump_0.dat till the next 60-second video file Vdo_dump_1.dat is filled and available. At time T3, once the Vdo_dump_1.dat is also filled with 60 seconds of video data (i.e., video frames), the BMC will start recording the third file Vdo_dump_λ.dat to fill next 60 seconds of video data in the third file Vdo_dump_2.dat. At this point of time, the BMC will have two 60-second video dumps available. Thus, to reduce memory overuse, the BMC can delete the older video dump, i.e., Vdo_dump_0.dat as soon as it started recording the third file Vdo_dump_2.dat.

After deletion of the older Vdo_dump_0.dat, data available at T3 timestamp may be shown in a Table 2, which is provided as below:

TABLE 2

| T3 time = T2 + 60 sec | Vdo_dump_1.dat | Vdo_dump_2.dat |
|---|---|---|

Consequently, the data available at Tn timestamp (where n is a positive integer greater than 2) may be shown in a Table 3, which is provided as below:

TABLE 3

| Tn time stamp | Vdo_dump_n-2.dat | Vdo_dump_n-1.dat |
|---|---|---|

By this kind of design, at any point of time, the BMC has one stored video file with specified duration, and another video file in the process of filling.

The recording method as described above requires a video of last n seconds before crash. Thus, the BMC needs to store around 2n seconds of data at one point of time. In certain embodiments, the data may be maintained in the memory 154 of the BMC, provided that the data does not need to be written to the non-volatile memory 156 until the incident occurs and the last X seconds of data is identified with reference to the incident. However, the available space in the memory 154 of the BMC is limited, and the recording method as described above may not be efficient.

Figure 2:
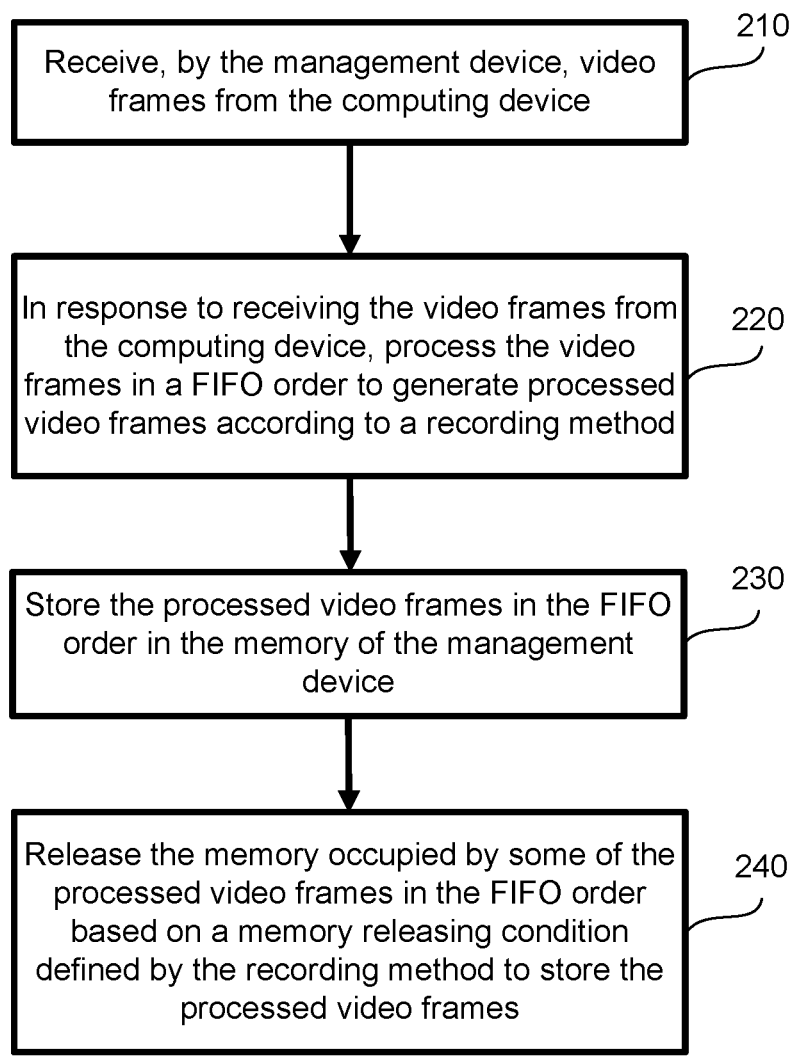
FIG. 2 depicts a flowchart of a video recording method according to certain embodiments of the present disclosure.

In certain aspects, an efficient recording method is provided for recording video redirected from the computing device 110, by the management device 150. FIG. 2 depicts a flowchart of a video recording method according to certain embodiments of the present disclosure. As shown in FIG. 2, at procedure 210, video frames from the computing device 110 is redirected to or received by the management device 150 (or BMC). At procedure 220, in response to receiving the video frames from the computing device 150, the management device 150 processes the video frames in a FIFO order to generate processed video frames according to a recording method. In certain embodiments, the recording method may be provided by the algorithm database 164 of the management device 150 as shown in FIG. 1. At procedure 230, the management device 150 record or store the processed video in the FIFO order in the memory 154 of the management device 150. At procedure 240, the management device 150 may release the memory space occupied by some of the processed video frames in the FIFO order based on a memory releasing condition defined by the recording method to store the processed video frame.

In certain embodiments, the processing of the received video frames to generate processed video frames at procedure 220 may be any suitable method. For example, each of the processed video frames being generated may be a full frame or a delta frame. The process of generating a delta frame may be based on the current received video frame and the previous received video frame. In certain embodiments, all of the video frames received by the management device 150 may be processed. In certain embodiments, only some of the video frames received by the management device 150 may be processed. For example, the management device 150 may generate one processed video frame from every other one of the received video frames, or may generate one generated frame to from every five received video frames. In certain embodiments, the full frames may be directly copied from the video frames received, or may be processed video frames. For example, in certain embodiments, the processed video frames may be compressed from the received video frames.

In certain embodiments, the recording method may define at most W windows. For example, the recoding method may be a single-window method where W=1 (i.e., only one window is defined), or a multiple-window method where W>1 (i.e., multiple windows are defined). In certain embodiments, each window may include multiple processed video frames, including a first processed video frame and at least one subsequent processed video frame in the FIFO order. In certain embodiments, for each window, the first processed video frame may be a full frame, and each of the at least one subsequent processed video frame may be a delta frame.

In certain embodiments, the recording method may define multiple optimized parameters, is configured to determine/optimize at least two parameters selected from multiple parameters. For example, the optimized parameters being defined by the recording method may include the number W of the windows, the maximum number N of the processed video frames in each of the W windows, the maximum size S of the memory occupied by each of the W windows, and the number M of the processed video frames to be released, where N, S and M are respectively positive integers, N>1, and M is no greater than N. The value of each of the optimized parameters may be determined based on the available memory size of the memory 154 to store the processed video frames.

In certain embodiments, the method as shown in FIG. 2 may include additional procedures. For example, in certain embodiments, when the algorithm database 164 of the management device 150 provides multiple algorithms for the recording method, the management device 150 may select the recording method from the algorithms being provided. In certain embodiments, the management device 150 may automatically select the recording method from the algorithms according to the available memory size of the memory 154. Other factors that may be relevant to the selection of the algorithms may include the total size of the memory 154, the allocated space of the memory 154 for recording the processed video frames, and/or the processing power of the processor 152. Alternatively, the management device 150 may select the recording method from the algorithms based on user input.

Multiple algorithms may be used as the recording method to optimize the efficiency of resource usage of the management device 150. In certain embodiments, the algorithms may include: a sliding window recording method, a multiple-window with fixed window size (hereinafter multiple-window fixed size) recording method, and a multiple-window with dynamic window size (hereinafter multiple-window dynamic size) recording method. Each of the recording methods will be introduced hereinafter in details.

Sliding Window

In certain aspects, a sliding window recording method is provided as the recording method for recording the video frames, so as to improve efficiency of recording. The sliding window recording method is a single-window method, where W=1 (i.e., only one window is defined). In other words, only one set of processed video frames may be stored in the memory 154. The optimized parameters of the sliding window recording method include the maximum number N of the processed video frames in the window and the number M of the processed video frames to be released. Further, the memory releasing condition of the sliding window recording method is storing N of the processed video frames in the FIFO order in the memory and receiving a new video frame to be processed.

As discussed above, a window includes a full frame as the first processed video frame, and one or more delta frames as the subsequent processed video frames. The challenge for optimizing memory usage in storing the video frames will be with the size of the full frame as needed for the window (or in the case of video files, for each of the individual file). The sliding window concept uses a single window with a length (i.e., the maximum number N of the processed video frames in the window) equals to or greater than the required history length. In other words, the window contains one full frame and at most (N−1) delta frames. At every fixed interval, the window is repositioned to eliminate the older frames by releasing the memory occupied by first to M-th processed video frames. This requires a new full frame to be constructed with reference to the new start position of the window. This approach is suitable for systems with more computing power.

Figure 3A:
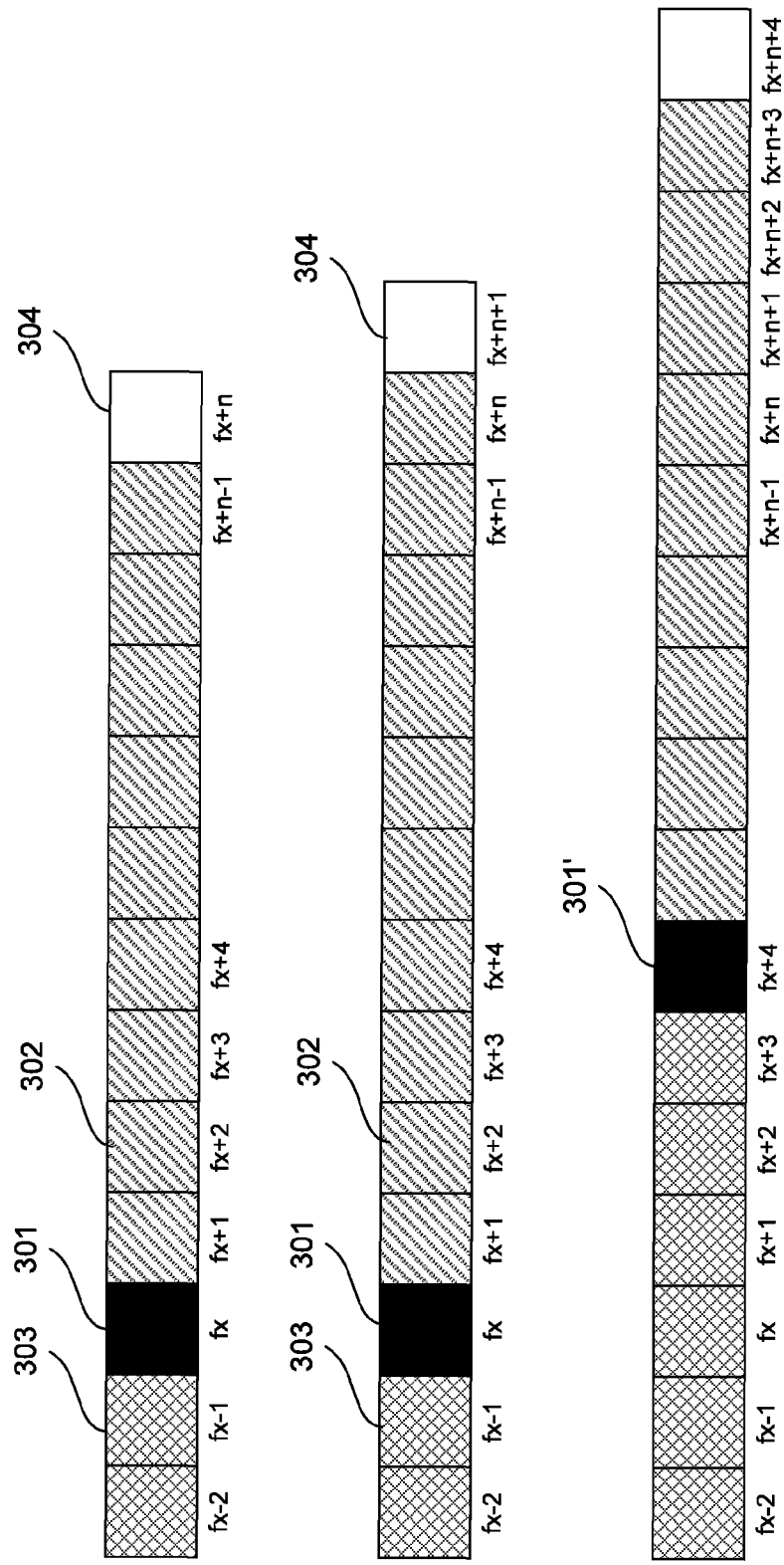
FIG. 3A schematically depict a sliding window recoding method according to certain embodiments of the present disclosure.

FIG. 3A schematically depicts a sliding window recoding method according to certain embodiments of the present disclosure. As shown in FIG. 3A, the video frames are illustrates as boxes, where a solid black box 301 represents a full frame; a box having slashed lines 302 represents a delta frame; a box having crossed lines 303 represents old discarded or deleted video frames (i.e., the memory space being occupied by the video frames have been released); and the empty box 304 represents a next processed video frame expected. As shown in the top row of FIG. 3A, the sliding window recording method defines a window starts at the frame fx (illustrated by the box 301), and includes one full video frame fx and (n−1) delta video frames from fx+1 to fx+n−1. In other words, n video frames have been stored or recorded at this point, where n is a positive integer. When n=N, the window has reached the maximum number N of the processed video frames in the window. Then, as shown in the middle row of FIG. 3A, the management device 150 continues the recording process and a new delta video frame fx+n is recorded, such that the window now includes one full frame fx and n delta frames from fx+1 to fx+n. In other words, the number of the video frames being stored or recorded becomes (n+1). In order to further record new frames, certain old frames need to be deleted to release the memory being occupied for storing new video frames. As shown in the bottom row of FIG. 3A, the delta video frame fx+4 is converted from the delta frame to a full frame (illustrated by the box 301'), and four frames from fx to fx+3 are deleted to release the memory space occupied by these deleted frames. In other words, M=4 (i.e., the number of the processed video frames to be released is 4). In this case, the released memory space may be available for the new video frames fx+n+1 to fx+n+3 to be stored or recorded. In certain embodiments, the number M of frames to be deleted or released may be any positive integer that is smaller than N (i.e., the maximum number of the frames in the window). For example, the number M of frames to be deleted or released at one time may be in a range of 1-20. In certain embodiment, the number M of frames to be deleted at one time may be in a range of 2-10. In certain embodiment, the number M of frames to be deleted at one time may be in a range of 3-5. In certain embodiments, the method performs converting the delta frame fx+4 to a full frame, deleting frames fx to fx+3, and recording new frames fx+n+1 to fx+n+3 sequentially. In certain embodiments, the sequence of performing the converting, deleting and recording may be in any other suitable order.

Figure 3B:
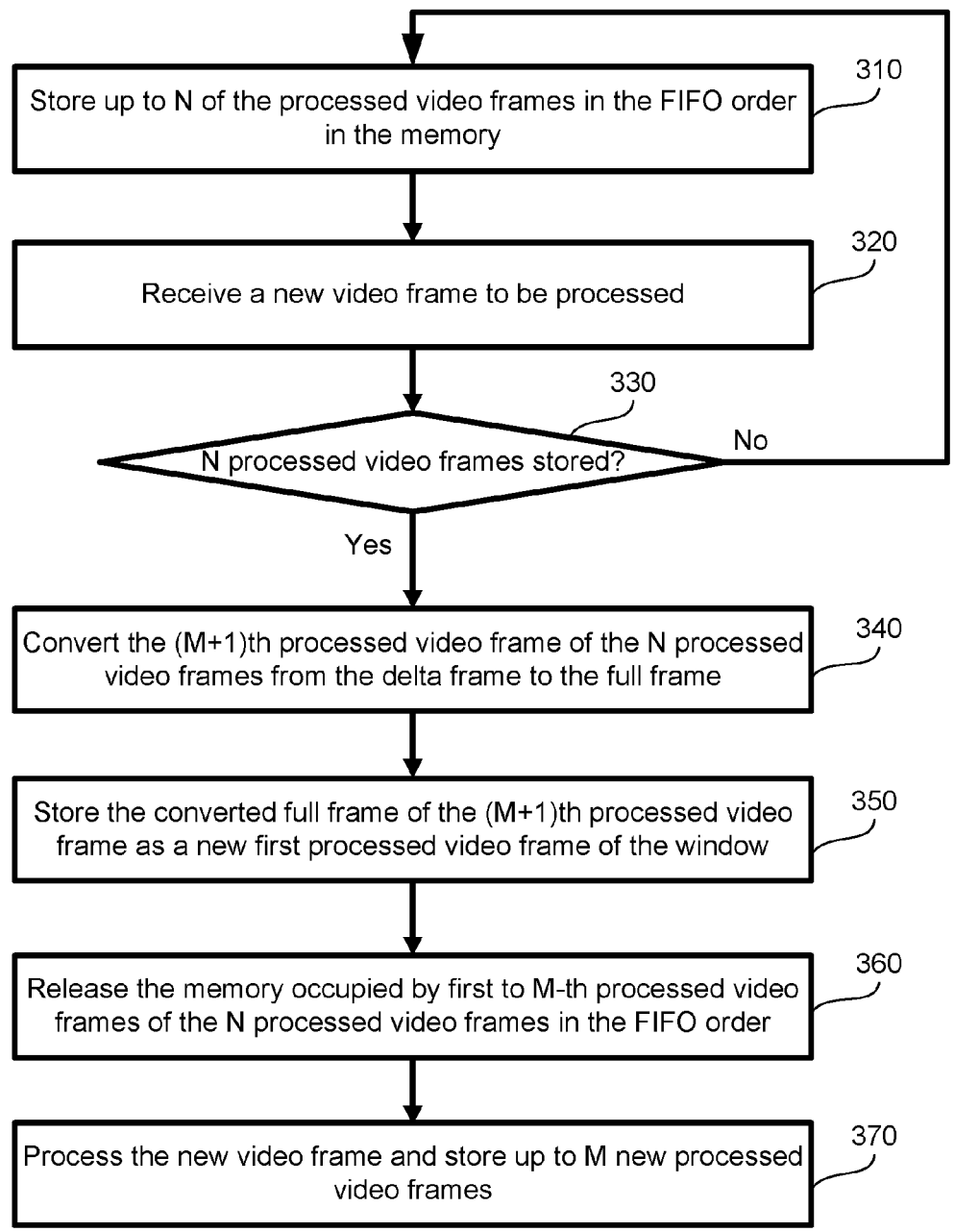
FIG. 3B depicts a flowchart of the sliding window recording method according to certain embodiments of the present disclosure.

FIG. 3B depicts a flowchart of the sliding window recording method according to certain embodiments of the present disclosure. As shown in FIG. 3B, at procedure 310, the management device 150 stores up to N of the processed video frames in the FIFO order in the memory 154. These processed video frames include a full frame 301 and up to (N−1) delta frames 302 as shown in FIG. 3A. The value of N may be determined based on the available memory space of the memory 154.

At procedure 320, the management device 150 receives a new video frame to be processed. As described above, the memory releasing condition of the sliding window recording method is storing N of the processed video frames in the FIFO order in the memory 154 and receiving a new video frame to be processed. Thus, at procedure 330, the management device 150 determines whether N processed video frames have been stored. If N processed video frames have been stored, the process moves to procedure 340. If the number of the processed video frames being stored has not reached N, the process moves back to procedure 310.

In response to the memory releasing condition of the sliding window recording method being met, at procedure 340, the management device 150 converts the (M+1)th processed video frame (e.g., the frame fx+4 as shown in FIG. 3A when M=4) of the N processed video frames from the delta frame to the full frame. The value of M may be determined based on the available memory space of the memory 154. At procedure 350, the management device 150 stores the converted full frame of the (M+1)th processed video frame as a new first processed video frame of the window. It should be noted that the converted full frame of the (M+1)th processed video frame may be saved at a different location of the memory 154 from the memory space occupied by the delta frame before conversion, since the memory space required for the full frame will be more than the memory space required for the delta frame.

At procedure 360, the management device 150 releases the memory occupied by first to M-th processed video frames (i.e. the frames to be deleted) of the N processed video frames in the FIFO order. For example, as shown in FIG. 3A, when M=4, the first to fourth processed video frames fx to fx+3 are deleted. In this case, the number of the processed video frames becomes (N−M). As described above, the procedures 340, 350 and 360 may be performed in a different order from the order as shown in FIG. 3B. At procedure 370, the management device 150 processes the new video frame and stores up to M new processed video frames.

As described above, the values of the optimized parameters M and N of the sliding window recording method may be determined based on the available memory space of the memory 154. In certain embodiments, the values of the optimized parameters M and N may be derived from data obtained in the previous recording processes. For example, data of the recording of the previous power up of the computing device 150 or the previous incident occurred in the computing device 110 may be used to obtain the values of M and N.

In certain embodiments, the values of the optimized parameters M and N may be determined that (N−M) is greater than a predetermined number X, where X represents a number of the processed video frames required for recording an incident of the computing device 110, such that the incident is diagnosable based on the vide frames recorded. For example, if the record rate of the video frames is 10 frames per second, and data of the recording of a previous incident in the computing device 110 indicates that at least 5 seconds of the video may be required, the values of M and N may be determined such that (N−M)>50.

Multiple-Window Fixed Size

In certain aspects, a multiple-window fixed size recording method is provided as the recording method for recording the video frames, so as to improve efficiency of recording. As described by its name, the multiple-window fixed size recording method is a multiple-window method, where W>2 (i.e., 3 or more windows are defined), and each window has a fixed window size. In other words, for all of the windows defined by the method, each window includes a fixed maximum number N of the processed video frame. However, since each of the video frames may have different data size, the data size (i.e., the memory space occupied) of the multiple windows may be different. The optimized parameters of the multiple-window fixed size recording method include the number W of the windows being defined and the maximum number N of the processed video frames in the window, and M=N. In other words, the processed video frames are released by a window at a time, such that the number M of the processed video frames to be released equals to the maximum number N of the processed video frames in the window. Further, the memory releasing condition of the multiple-window fixed size recording method is storing the W windows of the processed video frames in the FIFO order in the memory and receiving a new video frame to be processed.

FIG. 4A schematically depict a multiple-window fixed size recoding method according to certain embodiments of the present disclosure. As shown in FIG. 4A, the video frames are illustrates as boxes, where a solid black box 401 represents a full frame; a box having slashed lines 402 represents a delta frame; and a box having crossed lines 403 represents old discarded or deleted video frames (i.e., the memory space being occupied by the video frames have been released). Further, as shown in FIG. 4A, each window 400 includes at most N=5 processed video frames, including a full frame and 4 delta frames. Moreover, at most W=3 windows may be defined.

As shown in the top row of FIG. 4A, two windows of video frames have been stored in the memory 154, including a first window 400 starting at the frame fx (illustrated by a first solid black box 401), and includes one full frame fx and four delta frames from fx+1 to fx+4; and a second window 400' starting at the frame fx+5 (illustrated by a second solid black box 401), and includes one full frame fx+5 and four delta frames from fx+6 to fx+9. At this point, the memory releasing condition of the multiple-window fixed size recording method is not met since only 2 windows are stored.

As shown in the middle row of FIG. 4A, three windows of video frames have been stored in the memory 154, including the first and second windows, and a new third window starting at the frame fx+10 (illustrated by a third solid black box 401), and includes one full frame fx+10 and four delta frames from fx+11 to fx+14. At this point, if a new video frame is received, the memory releasing condition of the multiple-window fixed size recording method may be met since 3 windows are stored.

As shown in the bottom row of FIG. 4A, when a new fourth window of video frames are processed and stored in the memory 154, the first window (i.e., the video frames fx to fx+4) may be deleted such that the memory space occupied by the video frames of the first window may be released for storing the new video frames in the fourth window.

Figure 4B:
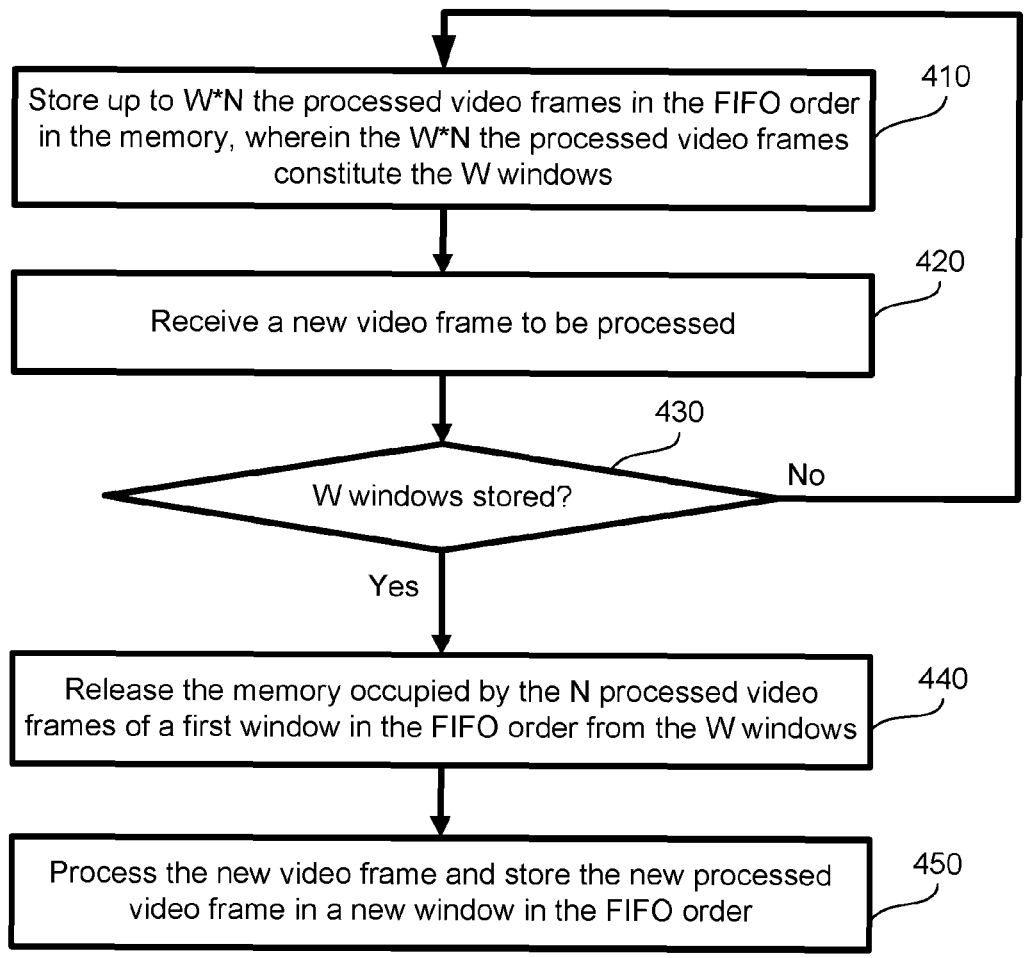
FIG. 4B depicts a flowchart of the multiple-window fixed size recoding method according to certain embodiments of the present disclosure.

FIG. 4B depicts a flowchart of the multiple-window fixed size method according to certain embodiments of the present disclosure. As shown in FIG. 4A, at procedure 410, the management device 150 stores up to W*N the processed video frames in the FIFO order in the memory 154, where the W*N the processed video frames constitute the W windows, and each window includes N of the processed video frames, including a full frame 401 and (N−1) delta frames 402 as shown in FIG. 4A. The values of W and N may be determined based on the available memory space of the memory 154.

At procedure 420, the management device 150 receives a new video frame to be processed. As described above, the memory releasing condition of the multiple-window fixed size recording method is storing the W windows of the processed video frames in the FIFO order in the memory 154 and receiving a new video frame to be processed. Thus, at procedure 430, the management device 150 determines whether W windows of the processed video frames (i.e., W*N processed video frames) have been stored. If W windows of the processed video frames have been stored, the process moves to procedure 440. If the number of the windows being stored has not reached W, the process moves back to procedure 410.

In response to the memory releasing condition of the multiple-window fixed size recording method being met, at procedure 440, the management device 150 releases the memory occupied by the N processed video frames of a first window in the FIFO order from the W windows. Then, at procedure 450, the management device 150 processes the new video frame and stores the new processed video frame in a new window in the FIFO order.

As described above, the values of the optimized parameters W and N of the multiple-window fixed size recording method may be determined based on the available memory space of the memory 154. In certain embodiments, the values of the optimized parameters W and N may be determined according to other factors, such as the total memory size of the memory 154, the memory size of an partition or region of the memory 154 that is allocated for recording frames, or/and the processing potential of the processor 152. In certain embodiments, the value of N of the multiple-window fixed size recording method may be determined by a ratio between a full frame memory size of the full frame (i.e., the first processed video frame) and a delta frame memory size of the delta frames (i.e., the subsequent processed video frames) in the first window of the W windows, or in any window of the W windows.

In certain embodiments, the split video windows (or files) are managed by a link list, so that the continuous video can be constructed. When a window (or a file) is no more needed and deleted, it is removed from the link list and when a new window is created for the new window, the window is added to the linked list. In certain embodiments, the link list may be stored in the memory 154. Alternatively, in certain embodiments, the link list may be stored in the algorithm database 164, or may be stored in a separate location of the management device 150.

In certain embodiments, the values of the optimized parameters W and N may be derived from data obtained in the previous recording processes. For example, data of the recording of the previous power up of the computing device 150 or the previous incident occurred in the computing device 110 may be used to obtain the values of W and N.

In one example, if data of the recording of a previous incident in the computing device 110 indicates that at least 60 seconds of the video may be required, the values of W and N may be determined such that the management device 150 keeps a 65 seconds of video. For example, the video being recorded may be split as intervals of 5 seconds each, and each window will includes 5 seconds of video frames (e.g., N=50 video frames if the record rate of the video frames is 10 frames per second). Thus, for the 65 seconds of video, W=11 windows will be obtained. At the start of the 66th second, the first window (for the first 5 seconds) can be deleted from the memory 154 such that the memory space being occupied by the first window may be released for the new window. This means at any point of time, the management device 150 may keep 60-65 seconds of video on record, instead of the 120 seconds in the method of using video files as described above.

In another example, if each window includes only 2 seconds of video (e.g., N=20 video frames if the record rate of the video frames is 10 frames per second), then a total of W=31 windows will be obtained, and only 60-62 seconds of video will be on record. However, every time a new window is started, a full frame is needed. Hence, the size of the individual windows will increase. In other words, by reducing the value of N (and thus increasing the value of W), the total length of the video may be reduced, but the actual memory size of the may not be reduced because of the increasing number of full frames.

According to certain embodiments of the present disclosure, an optimal size of the fixed window works the best, depending on the size of the delta frames with respect to the full frame. The size of the delta frame is based on the video in progress, hence the optimal window size may not be a fixed value.

In one example, for a total of 1000 frames needed to be on record, if the record rate is 10 frames per second, the 1000 frames correspond to a 100 seconds record. Assuming that a memory size of a full frame is 100 KB, and a memory size of a delta frame is 1 KB, the values of the optimized parameters W and N may be obtained using the following calculations:

When 1000 recorded frames is required, and a window has a size of N=1000 frames, the window would have a size of 1099 KB. Since two windows are needed to have at least 1000 video frames at any time, the total memory size would be the memory size of W=2 windows. That is:

Window memory size=100 KB+999×1 KB=1099 KB, and

Total memory size=2×1099=2198 KB.

In a different case, when 1000 recorded frames is required, and a window has a size of N=500 frames, the size of each of the window would be 599 KB. Since three windows are needed to have at least 1000 video frames at any time, the total memory size would be the memory size of W=3 windows. That is:

Window memory size=100 KB+499×1 KB=599 KB, and

Total memory size=3×599=1797 KB.

In a different case, when 1000 recorded frames is required, and a window has a size of N=250 frames, the size of each of the window would be 349 KB. Since five windows are needed to have at least 1000 video frames at any time, the total memory size would be the memory size of W=5 windows. That is:

Window memory size=100 KB+299×1 KB=349 KB, and

Total memory size=5×349=1745 KB.

In this way, the values of the optimized parameters of W and N may be determined. In certain embodiments, optimal count of frames is determined as follows. Based on the delta frame size with respect to a full frame, there is an optimal window size (count of frames) where the memory requirement is low. The delta frame size may be expressed as percentage of full frame. The following Table 4 lists the frames per file for a delta frame size of 10 (10% of full frame size), and the data being used for analysis to generate the dataset include: a required 100 seconds history of video, with 10 frames per second.

TABLE 4

| Window Size | Files needed | Individual File Size | Total Size |
|---|---|---|---|
| 1000 | 2 | 10090 | 20180 |
| 500 | 3 | 5090 | 15270 |
| 250 | 5 | 2590 | 12950 |
| 200 | 6 | 2090 | 12540 |
| 100 | 11 | 1090 | 11990 |
| 50 | 21 | 590 | 12390 |
| 40 | 26 | 490 | 12740 |
| 25 | 41 | 340 | 13940 |
| 20 | 51 | 290 | 14790 |
| 10 | 101 | 190 | 19190 |
| 5 | 201 | 140 | 28140 |
| 2 | 501 | 110 | 55110 |

Calculating the total size needed for each window size for different delta frame (5%, 10%, 20%, 30%, 40%, 50% expressed as percentages of full frame), the following Table 5 may be obtained.

TABLE 5

| Window Size | Total_05 | Total_10 | Total_20 | Total_30 | Total_40 | Total_50 |
|---|---|---|---|---|---|---|
| 1000 | 10190 | 20180 | 40160 | 60140 | 80120 | 100100 |
| 500 | 7785 | 15270 | 30240 | 45210 | 60180 | 75150 |
| 250 | 6725 | 12950 | 25400 | 37850 | 50300 | 62750 |
| 200 | 6570 | 12540 | 24480 | 36420 | 48360 | 60300 |
| 100 | 6545 | 11990 | 22880 | 33770 | 44660 | 55550 |
| 50 | 7245 | 12390 | 22680 | 32970 | 43260 | 53550 |
| 40 | 7670 | 12740 | 22880 | 33020 | 43160 | 53300 |
| 25 | 9020 | 13940 | 23780 | 33620 | 43460 | 53300 |
| 20 | 9945 | 14790 | 24480 | 34170 | 43860 | 53550 |
| 10 | 14645 | 19190 | 28280 | 37370 | 46460 | 55550 |
| 5 | 24120 | 28140 | 36180 | 44220 | 52260 | 60300 |
| 2 | 52605 | 55110 | 60120 | 65130 | 70140 | 75150 |

Figure 4C:
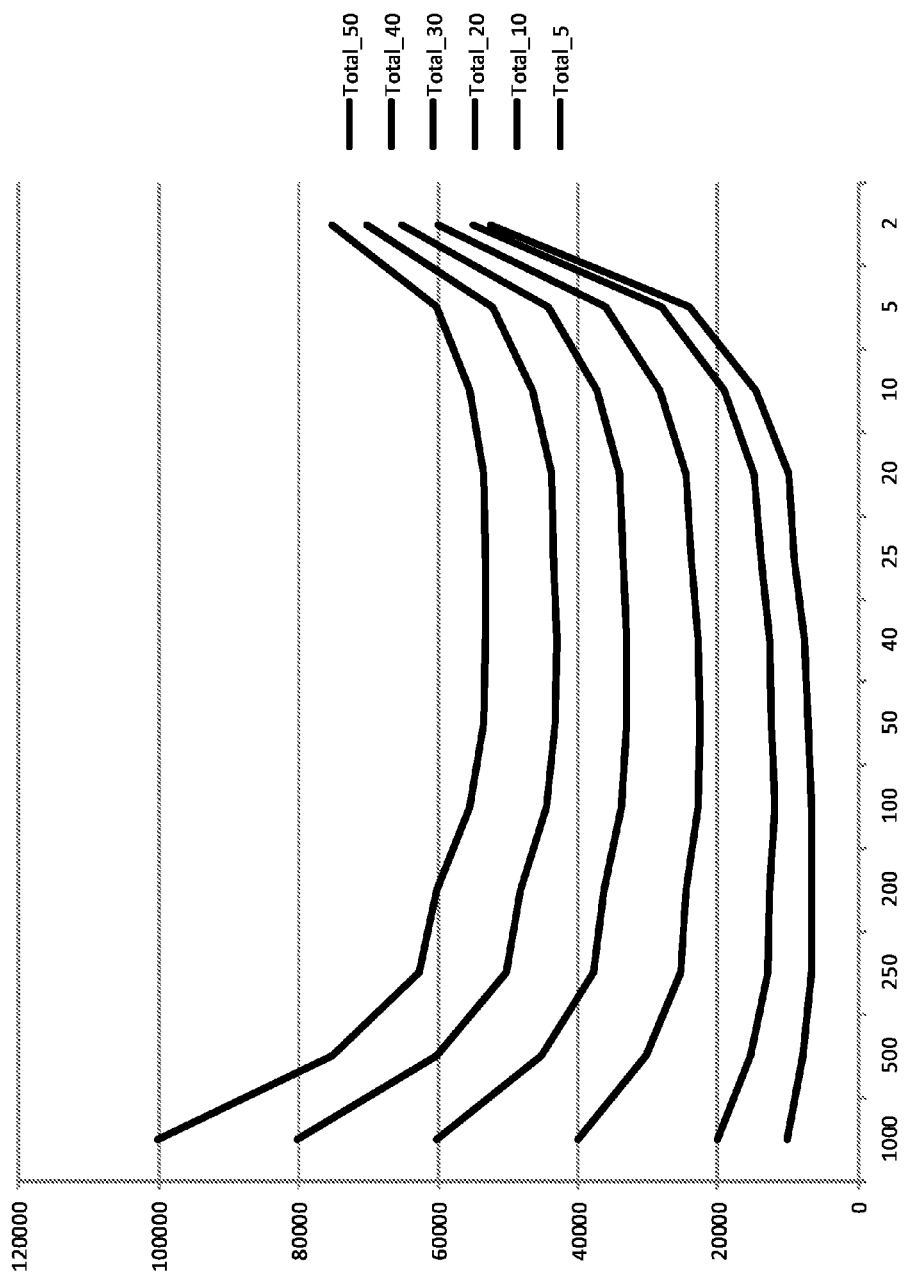
FIG. 4C schematically depicts the total memory requirement versus window size according to certain embodiments of the present disclosure.

FIG. 4C schematically depicts the total memory requirement versus window size according to certain embodiments of the present disclosure. Specifically, the chart as shown in FIG. 4C is plotted with the data of Table 5, showing the total memory requirement versus window size, with delta frames as 5%, 10%, 20%, 30%, 40%, and 50% with respect to full frame size. As shown in FIG. 4C, the X axis is the total memory required, and the Y axis is the window size (number of frames in a window). The bolded and italicized numbers in Table 5 indicate the smallest total size of all the multiple windows having the processed video frames, which may correspond to an optimal window size under certain full video frame/delta frame size ratio.

Multiple-Window Dynamic Size

In certain aspects, a multiple-window dynamic size recording method is provided as the recording method for recording the video frames, so as to improve efficiency of recording. As described by its name, the multiple-window fixed size recording method is a multiple-window method, where W>2 (i.e., 3 or more windows are defined), and each window has a "dynamic" window size. In other words, for all of the windows defined by the method, the maximum number N of the processed video frame of each window and the number W of the windows may be respectively variable. The optimized parameters of the multiple-window dynamic size recording method include the maximum size S of the memory occupied by each of the W windows, and the required number R of the processed video frames to be stored. Further, the memory releasing condition is storing the required number R of the processed video frames in the FIFO order in the memory and receiving a new video frame to be processed.

Figure 5A:
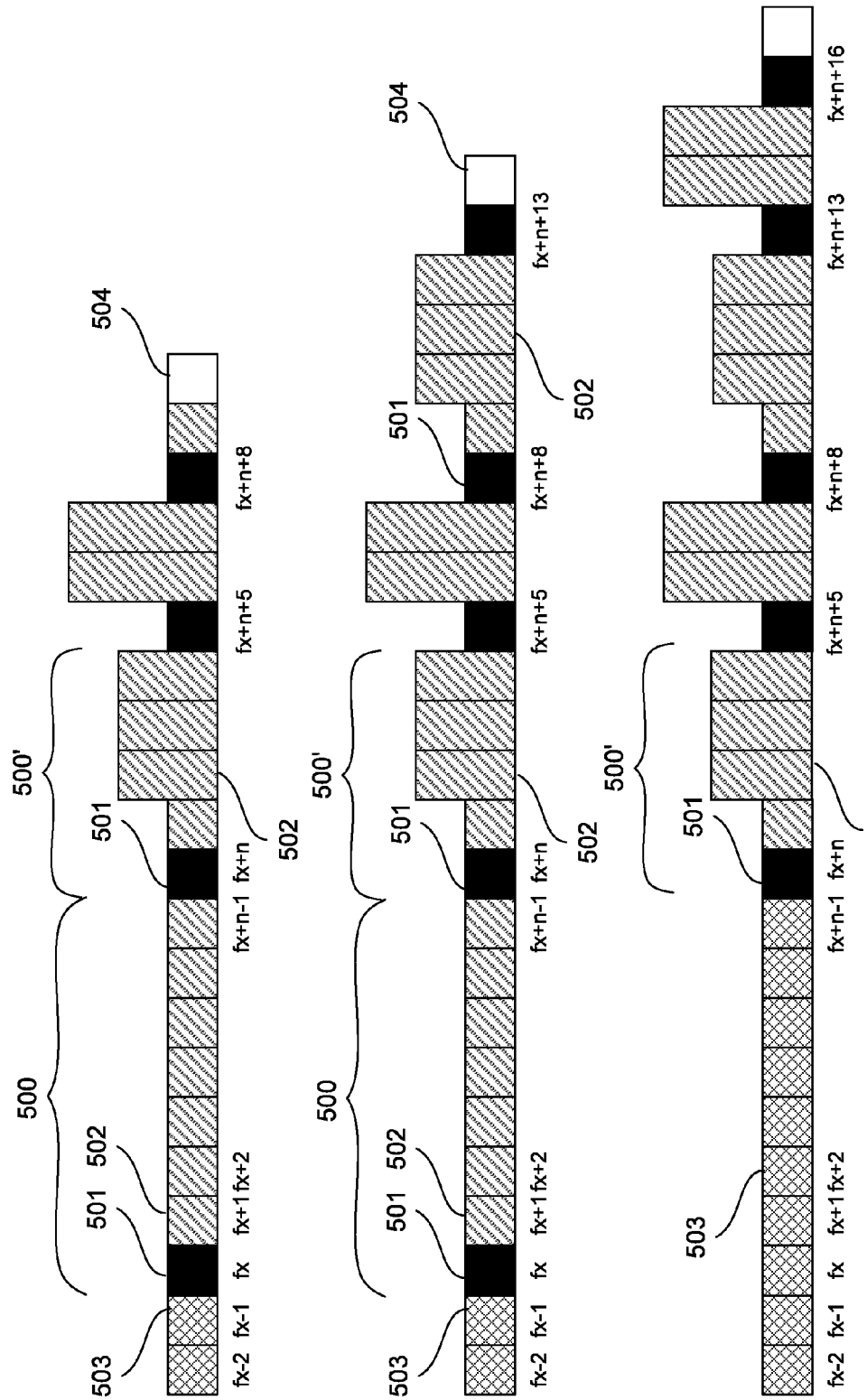
FIG. 5A schematically depict a multiple-window dynamic size recoding method according to certain embodiments of the present disclosure.

FIG. 5A schematically depict a multiple-window dynamic size recoding method according to certain embodiments of the present disclosure. As shown in FIG. 5A, the video frames are illustrates as boxes, where a solid black box 501 represents a full frame; a box having slashed lines 502 represents a delta frame; a box having crossed lines 503 represents old discarded or deleted video frames (i.e., the memory space being occupied by the video frames have been released); and the empty box 504 represents a next processed video frame expected. It should be noted that each of the delta frames 502 may have different heights, and the height of each delta frame 502 represents the relative memory size occupied by the delta frame comparing to other delta frames. However, the height of each of the delta frames are just illustrative and do not correspond to their actual sizes. Further, as shown in FIG. 5A, each window 500 includes a predetermined maximum size S of the memory occupied by the video frames of the window 500. Thus, the maximum number N of the processed video frame of each window may be variable. For example, the first window 500 include one full frame 501 (the frame fx) and (n−1) delta frames 502 (including frames fx+1 to fx+n−1), and the second window 500' include one full frame 501 (the frame fx+n) and 4 delta frames 502 (including the frames fx+n+1 to fx+n+4). The relative memory size occupied by 3 of the delta frames 502 (the frames fx+n+2 to fx+n+4) of the second window 500' are greater than the memory size occupied by the delta frames 502 of the first window 500. Moreover, at most W=4 windows may be defined.

As shown in the top row of FIG. 5A, three windows of video have been recorded, and each has different average delta frame sizes, and thus different window sizes. The first window 500 starts from fx as a full frame 501, and has the delta frames 502 from fx+1 to fx+n−1. The delta frames 502 of the first window 500 has a relative small data size. The second window 500' starts from a full frame fx+n, and has four delta frames 502, including the frames fx+n+1 to fx+n+4. The delta frame fx+n+1 has a relative small delta size, while each of the delta frames fx+n+2, fx+n+3 and fx+n+4 has a relative large delta size. The third window includes a full frame fx+n+5, and two delta frames 502, including fx+n+6 and fx+n+7. The two delta frames 502 of the third window have relatively large data size. It is shown by the size of the three windows that, when the delta frames 502 of a window have relative small data sizes, a window would include more delta frames 502; when the delta frames 502 of a window have relative large data sizes, a window would include fewer delta frames 502.

As shown in the middle row of FIG. 5A, the recording of the fourth window has finished. The fourth window starts from the full frame 501 of fx+n+8, and includes one delta frame 502 with relative small data size and three delta frames 502 with relative large data sizes. At this time, a fifth window has started recording. The recording of the fifth window starts from the full frame of fx+n+13, but the first window 500 does not need to be deleted. Thus, the number W of the windows may be variable. The deletion of old windows starts when the history has the required number R of video frames.

As shown in the bottom row of FIG. 5A, after recording the fifth window from fx+n+13 to fx+n+15, the management device 150 has recorded the required number R of frames. At this time, before or during recording a new window, the old window (i.e., the first window 500) can be deleted. For example, the management device 150 may delete all the frames in the first window from fx to fx+n−1 (or from fx to fx+7), and starts a sixth window from the full frame fx+n+16.

Figure 5B:
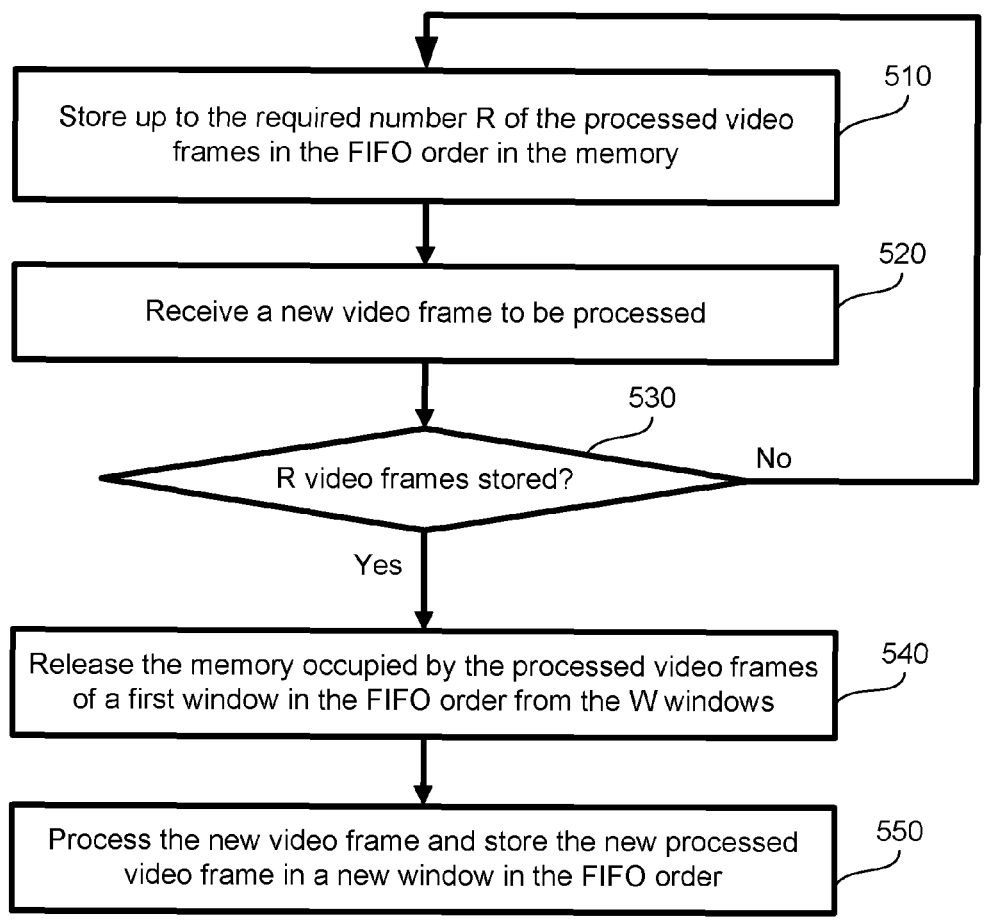
FIG. 5B depicts a flowchart of the multiple-window dynamic size recoding method according to certain embodiments of the present disclosure.

FIG. 5B depicts a flowchart of the multiple-window dynamic size recoding method according to certain embodiments of the present disclosure. As shown in FIG. 5B, at step 510, the management device 150 stores up to the required number R of the processed video frames in the FIFO order in the memory 154. The value of R may be determined based on the available memory space of the memory 154.

At procedure 520, the management device 150 receives a new video frame to be processed. As described above, the memory releasing condition of the multiple-window dynamic size recording method is storing the required number R of the processed video frames in the FIFO order in the memory and receiving the new video frame to be processed. Thus, at procedure 530, the management device 150 determines whether R processed video frames have been stored. If R processed video frames have been stored, the process moves to procedure 540. If the number of the processed video frames being stored has not reached R, the process moves back to procedure 510.

In response to the memory releasing condition of the multiple-window dynamic size recording method being met, at procedure 540, the management device 150 releases the memory occupied by the N processed video frames of a first window (i.e., the old window) in the FIFO order from the W windows. Then, at procedure 550, the management device 150 processes the new video frame and stores the new processed video frame in a new window in the FIFO order.

In certain embodiments, a value of S is determined by a ratio between a full frame memory size of the full frame (i.e., the first processed video frame) and a delta frame memory size of the delta frames (i.e., the subsequent processed video frame) of one of the windows 500. In certain embodiments, for each of the W windows, the delta frame memory size of the at least one subsequent processed video frame is an average memory size of each of the at least one subsequent processed video frame. For example, the ratio may be obtained by comparing the size of the first video frame (full frame) in one of the multiple windows and the average size of two or more delta frames in that window following the first full frame. In one exemplary embodiment, the management device 150 records the first video frame in the first window 500, where the first video frame is a full frame. The management device 150 then records the second video frame in the first window, where the second frame is a delta frame. The sizes of the first frame (which is a full frame) and the second frame (which is a delta frame) are compared to determine the size of the first window. Then the third video frame (also a delta frame) is recorded. At this time, the sizes of the second video frame and the third video frame may be calculated to obtain an average size, and the sizes of the first full video frame and the average size of the second and third video frames (delta frames) are compared to determine the size of the first window. The size of the first window determined using the first video frame and the second frame (one delta frame) and the size of the first window using the first video frame and the second and third frames (two delta frames) may be different from each other, and the later determined size of the first window is used as an updated size of the first window. After recording the fourth frame (another delta frame), the size of the first window can then be updated again. Therefore, the size of the first window is not fixed, and is a dynamic value based on the dynamic ratio of the recorded frames in the first window.

In this embodiments, each of the multiple windows may have different sizes, i.e., have different numbers N of video frames. However, the data size of the multiple windows may be substantially similar. For examples, a window having small delta video frames may have a large number of video frames, while another window having large delta video frames may have fewer number of video frames.

The above multiple window method with dynamic size is further described as follows. Based on size of the delta frames for the recorded video in progress, the window size can be dynamically determined to have optimal memory usage. For example, if the sizes of the delta frames are high, new window may be started more frequently. The algorithm constantly monitors the size of the delta frame (using the average size) and the number of frames in the current window. In the simplest implementation, the solution may use a lookup table as described in the section of the multiple-window fixed size recording method to make the determination on when to start a new window. Alternative approach could use runtime calculations to determine when to start the new window.

In another aspect, the present disclosure relates to a non-transitory computer readable medium storing computer executable code. In certain embodiments, the computer executable code may be at least a part of the firmware 160 of the management device 150 as described above. The computer executable code, when being executed, may perform one of a method described above. In certain embodiments, the non-transitory computer readable medium may include, but not limited to, non-volatile memory 156 of the management device 150 as described above, or any other storage media of the management device 150.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a computing device; and
a management device in communication with the computing device, the management device comprising a processor, a memory and a non-volatile memory storing computer executable code, wherein the computer executable code, when executed at the processor, is configured to
receive, by the management device, video frames from the computing device; and
in response to receiving the video frames from the computing device,
process the video frames in a first-in-first out (FIFO) order to generate processed video frames according to a recording method;
store the processed video frames in the FIFO order in the memory of the management device; and
release the memory occupied by some of the processed video frames in the FIFO order based on a memory releasing condition defined by the recording method to store the processed video frame;
wherein the recording method defines at most W windows, W being a positive integer, each of the W windows comprises a first processed video frame and at least one subsequent processed video frame, and wherein for each of the W windows, the first processed video frame is a full frame, and each of the at least one subsequent processed video frame is a delta frame;
wherein the recording method defines, based on an available memory size of the memory to store the processed video frames, a plurality of optimized parameters selected from W, a maximum number N of the processed video frames in each of the W windows, a maximum size S of the memory occupied by each of the W windows, a number M of the processed video frames to be released, and a required number R of the processed video frames to be stored, wherein N, S, M and R are respectively positive integers, N>1, and M is no greater than N; and
wherein the memory releasing condition is determined by the plurality of optimized parameters.

2. The system of claim 1, wherein the management device is a baseboard management controller (BMC), and the computing device functions as a host computer for the BMC.

3. The system of claim 1, wherein the computer executable code, when executed at the processor, is further configured to select the recording method from a plurality of algorithms according to the available memory size of the memory.

4. The system of claim 1, wherein the recording method is a sliding window recording method, W=1, the optimized parameters comprise N and M, N>M, and the memory releasing condition is storing N of the processed video frames in the FIFO order in the memory and receiving a new video frame to be processed, wherein the sliding window recording method comprises:
storing up to N of the processed video frames in the FIFO order in the memory; and
in response to the memory releasing condition of storing the N of the processed video frames and receiving the new video frame to be processed,
converting the (M+1)th processed video frame of the N processed video frames from the delta frame to the full frame;
storing the converted full frame of the (M+1)th processed video frame as a new first processed video frame of the window;
releasing the memory occupied by first to M-th processed video frames of the N processed video frames in the FIFO order; and
processing the new video frame and storing up to M new processed video frames.

5. The system of claim 4, wherein (N−M) is greater than a predetermined number X, wherein X of the processed video frames are required for recording an incident of the computing device, such that the incident is diagnosable based on the vide frames recorded.

6. The system of claim 4, wherein M is in a range of 2-10.

7. The system of claim 1, wherein the recording method is a multiple-window fixed size recording method, W>2, the optimized parameters comprise W and N, M=N, and the memory releasing condition is storing the W windows of the processed video frames in the FIFO order in the memory and receiving a new video frame to be processed, wherein the multiple-window fixed size recording method comprises:
storing up to W*N the processed video frames in the FIFO order in the memory, wherein the W*N the processed video frames constitute the W windows; and
in response to the memory releasing condition of storing the W windows of the processed video frames in the FIFO order in the memory and receiving the new video frame to be processed,
releasing the memory occupied by the N processed video frames of a first window in the FIFO order from the W windows; and
processing the new video frame and storing the new processed video frame in a new window in the FIFO order.

8. The system of claim 7, wherein a value of N is determined by a ratio between a full frame memory size of the first processed video frame and a delta frame memory size of the at least one subsequent processed video frame in the first window of the W windows.

9. The system of claim 7, wherein the computer executable code, when executed at the processor, is further configured to:
provide a link list corresponding to each of the W windows, for constructing a continuous video from the processed video frames recorded in the W windows.

10. The system of claim 1, wherein the recording method is a multiple-window dynamic size recording method, W>2, the optimized parameters comprise S and R, the memory releasing condition is storing the required number R of the processed video frames in the FIFO order in the memory and receiving a new video frame to be processed, and W and N are respectively variable, wherein the multiple-window dynamic size recording method comprises:
storing up to the required number R of the processed video frames in the FIFO order in the memory; and
in response to the memory releasing condition of storing the required number R of the processed video frames in the FIFO order in the memory and receiving the new video frame to be processed,
releasing the memory occupied by the processed video frames of a first window in the FIFO order from the W windows; and
processing the new video frame and storing the new processed video frame in a new window in the FIFO order.

11. The system of claim 10, wherein a value of S is determined by a ratio between a full frame memory size of the first processed video frame and a delta frame memory size of the at least one subsequent processed video frame of each of the W windows.

12. The system of claim 11, wherein for each of the W windows, the delta frame memory size of the at least one subsequent processed video frame is an average memory size of each of the at least one subsequent processed video frame.

13. A method of recording video frames from a computing device by a management device, comprising:
   receiving, by the management device, video frames from the computing device; and
   in response to receiving the video frames from the computing device,
      processing, by the management device, the video frames in a first-in-first out (FIFO) order to generate processed video frames according to a recording method;
      storing the processed video frames in the FIFO order in a memory of the management device; and
      releasing the memory occupied by some of the processed video frames in the FIFO order based on a memory releasing condition defined by the recording method to store the processed video frame;
   wherein the recording method defines at most W windows, W being a positive integer, each of the W windows comprises a first processed video frame and at least one subsequent processed video frame, and wherein for each of the W windows, the first processed video frame is a full frame, and each of the at least one subsequent processed video frame is a delta frame;
   wherein the recording method defines, based on an available memory size of the memory to store the processed video frames, a plurality of optimized parameters selected from W, a maximum number N of the processed video frames in each of the W windows, a maximum size S of the memory occupied by each of the W windows, a number M of the processed video frames to be released, and a required number R of the processed video frames to be stored, wherein N, S, M and R are respectively positive integers, N>1, and M is no greater than N; and
   wherein the memory releasing condition is determined by the plurality of optimized parameters.

14. The method of claim 13, wherein the management device is a baseboard management controller (BMC), and the computing device functions as a host computer for the BMC.

15. The method of claim 13, further comprising:
   selecting, by the management device, the recording method from a plurality of algorithms according to the available memory size of the memory.

16. The method of claim 13, wherein the recording method is a sliding window recording method, W=1, the optimized parameters comprise N and M, N>M, and the memory releasing condition is storing N of the processed video frames in the FIFO order in the memory and receiving a new video frame to be processed, wherein the sliding window recording method comprises:
   storing up to N of the processed video frames in the FIFO order in the memory; and
   in response to the memory releasing condition of storing the N of the processed video frames and receiving the new video frame to be processed,
      converting the (M+1)th processed video frame of the N processed video frames from the delta frame to the full frame;
      storing the converted full frame of the (M+1)th processed video frame as a new first processed video frame of the window;
      releasing the memory occupied by first to M-th processed video frames of the N processed video frames in the FIFO order; and
      processing the new video frame and storing up to M new processed video frames.

17. The method of claim 13, wherein the recording method is a multiple-window fixed size recording method, W>2, the optimized parameters comprise W and N, M=N, and the memory releasing condition is storing the W windows of the processed video frames in the FIFO order in the memory and receiving a new video frame to be processed, wherein the multiple-window fixed size recording method comprises:
   storing up to W*N the processed video frames in the FIFO order in the memory, wherein the W*N the processed video frames constitute the W windows; and
   in response to the memory releasing condition of storing the W windows of the processed video frames in the FIFO order in the memory and receiving the new video frame to be processed,
      releasing the memory occupied by the N processed video frames of a first window in the FIFO order from the W windows; and
      processing the new video frame and storing the new processed video frame in a new window in the FIFO order.

18. The method of claim 17, wherein a value of N is determined by a ratio between a full frame memory size of the first processed video frame and a delta frame memory size of the at least one subsequent processed video frame in the first window of the W windows.

19. The method of claim 13, wherein the recording method is a multiple-window dynamic size recording method, W>2, the optimized parameters comprise S and R, the memory releasing condition is storing the required number R of the processed video frames in the FIFO order in the memory and receiving a new video frame to be processed, and W and N are respectively variable, wherein the multiple-window dynamic size recording method comprises:
   storing up to the required number R of the processed video frames in the FIFO order in the memory; and
   in response to the memory releasing condition of storing the required number R of the processed video frames in the FIFO order in the memory and receiving the new video frame to be processed,
      releasing the memory occupied by the processed video frames of a first window in the FIFO order from the W windows; and
      processing the new video frame and storing the new processed video frame in a new window in the FIFO order.

20. The method of claim 19, wherein a value of S is determined by a ratio between a full frame memory size of the first processed video frame and a delta frame memory size of the at least one subsequent processed video frame of each of the W windows.

21. The method of claim 20, wherein for each of the W windows, the delta frame memory size of the at least one subsequent processed video frame is an average memory size of each of the at least one subsequent processed video frame.

22. A non-transitory computer readable medium storing computer executable code, wherein the computer executable code, when executed at a processor of a management device, is configured to:
  receive video frames from a computing device; and
  in response to receiving the video frames from the computing device,
    process the video frames in a first-in-first out (FIFO) order to generate processed video frames according to a recording method;
    store the processed video frames in the FIFO order in the memory of the management device; and
    release the memory occupied by some of the processed video frames in the FIFO order based on a memory releasing condition defined by the recording method to store the processed video frame;
  wherein the recording method defines at most W windows, W being a positive integer, each of the W windows comprises a first processed video frame and at least one subsequent processed video frame, and wherein for each of the W windows, the first processed video frame is a full frame, and each of the at least one subsequent processed video frame is a delta frame;
  wherein the recording method defines, based on an available memory size of the memory to store the processed video frames, a plurality of optimized parameters selected from W, a maximum number N of the processed video frames in each of the W windows, a maximum size S of the memory occupied by each of the W windows, a number M of the processed video frames to be released, and a required number R of the processed video frames to be stored, wherein N, S, M and R are respectively positive integers, N>1, and M is no greater than N; and
  wherein the memory releasing condition is determined by the plurality of optimized parameters.

23. The non-transitory computer readable medium of claim 22, wherein the computer executable code comprises:
  a redirection module, configured to receive the video frames from the computing device, and store the processed video frames in the memory of the management device;
  an algorithm database, configured to store information of the recording method; and
  a processing module, configured to process the video frames to generate the processed video frames according to the recording method.

24. The non-transitory computer readable medium of claim 22, wherein the recording method is a sliding window recording method, W=1, the optimized parameters comprise N and M, N>M, and the memory releasing condition is storing N of the processed video frames in the FIFO order in the memory and receiving a new video frame to be processed, wherein the sliding window recording method comprises:
  storing up to N of the processed video frames in the FIFO order in the memory; and
  in response to the memory releasing condition of storing the N of the processed video frames and receiving the new video frame to be processed,
    converting the (M+1)th processed video frame of the N processed video frames from the delta frame to the full frame;
    storing the converted full frame of the (M+1)th processed video frame as a new first processed video frame of the window;
    releasing the memory occupied by first to M-th processed video frames of the N processed video frames in the FIFO order; and
    processing the new video frame and storing up to M new processed video frames.

25. The non-transitory computer readable medium of claim 22, wherein the recording method is a multiple-window fixed size recording method, W>2, the optimized parameters comprise W and N, M=N, and the memory releasing condition is storing the W windows of the processed video frames in the FIFO order in the memory and receiving a new video frame to be processed, wherein the multiple-window fixed size recording method comprises:
  storing up to W*N the processed video frames in the FIFO order in the memory, wherein the W*N the processed video frames constitute the W windows; and
  in response to the memory releasing condition of storing the W windows of the processed video frames in the FIFO order in the memory and receiving the new video frame to be processed,
    releasing the memory occupied by the N processed video frames of a first window in the FIFO order from the W windows; and
    processing the new video frame and storing the new processed video frame in a new window in the FIFO order.

26. The non-transitory computer readable medium of claim 22, wherein the recording method is a multiple-window dynamic size recording method, W>2, the optimized parameters comprise S and R, the memory releasing condition is storing the required number R of the processed video frames in the FIFO order in the memory and receiving a new video frame to be processed, and W and N are respectively variable, wherein the multiple-window dynamic size recording method comprises:
  storing up to the required number R of the processed video frames in the FIFO order in the memory; and
  in response to the memory releasing condition of storing the required number R of the processed video frames in the FIFO order in the memory and receiving the new video frame to be processed,
    releasing the memory occupied by the processed video frames of a first window in the FIFO order from the W windows; and
    processing the new video frame and storing the new processed video frame in a new window in the FIFO order.

* * * * *